United States Patent

Reynal

[15] 3,656,066

[45] Apr. 11, 1972

[54] INFORMATION FORMAT CONVERTER-OSCILLATOR

[72] Inventor: Thomas J. Reynal, Harris County, Tex.

[73] Assignee: Systronics Incorporated

[22] Filed: May 27, 1970

[21] Appl. No.: 40,965

[52] U.S. Cl. ..............................331/65, 331/111, 331/135, 331/177

[51] Int. Cl. ..............................H03k 3/28

[58] Field of Search ..............................331/65, 108 C, 108 D, 111, 331/135, 136, 143, 177

[56] References Cited

UNITED STATES PATENTS

| | | | |
|---|---|---|---|
| 3,475,742 | 10/1969 | Whitney et al. | 331/111 X |
| 3,560,864 | 2/1971 | Nihof | 331/177 X |
| 3,564,455 | 2/1971 | Wedel | 331/143 X |
| 3,568,086 | 3/1971 | Perry | 331/65 |

OTHER PUBLICATIONS

Ho, " Variable Frequency Square Pulse Generator," Electronic Engineering, December 1963, pp. 822, 823.

*Primary Examiner*—Roy Lake
*Assistant Examiner*—Siegfried H. Grimm
*Attorney*—Pravel, Wilson & Matthews

[57] ABSTRACT

Information format converter receives input information represented by variable input resistance and converts this input information into an output signal whose frequency varies in accordance with the input information. A charge storage means charges over a time period in accordance with the resistance value of the input resistance and provides a signal to an output means, a bi-stable level detector, having two output threshold levels which changes state between the two levels when said storage means reaches either of the two levels. The converter can be connected so that the frequency of the output signal varies in direct proportion with the resistance value of the input or so that the period of the output signal varies in direct proportion with the resistance value of the input. The converter also uses a new bi-stable level detector which eliminates the requirement that precision reference voltages be used in the converter.

The converter can also be used as a voltage waveform generator.

26 Claims, 12 Drawing Figures

Thomas J. Reynal
INVENTOR

BY

Pravel Wilson & Matthews
ATTORNEYS

Thomas J. Reynal
INVENTOR

BY

Prauel Wilson & Matthews
ATTORNEYS

INFORMATION FORMAT CONVERTER-OSCILLATOR

BACKGROUND OF THE INVENTION

1. Field of the Invention

The present invention relates to a new and improved information format converter.

2. Description of the Prior Art

So far as is known, prior art information converters compared an input signal of varying voltage with a comparison reference voltage and used the difference between the two compared voltages to generate an output signal in a different format (digital code, or differing frequency) than the input. Highly accurate precision voltage references were required to preserve accuracy of the output information from the information converter. Variance, or drift, in this precision comparison voltage over a period of time caused inaccurate output signals, and could only be prevented by periodically performing a complex, tedious effort of recalibrating the precision reference voltage. Further, certain of the prior art format converters using resistance-capacitance integrators at the input, such as U.S. Pat. No. 3,409,763, required that the capacitor of the integrator be discharged at the end of each operating cycle, before initiation of new cycle, thus requiring added complex expensive circuitry to perform this function.

SUMMARY OF THE INVENTION

Briefly, the present invention comprises an input means whose resistance value is set according to an input variable being measured, an integrating operational amplifier whose charging time varies according to the resistance value of the input means, and an output bi-stable level detector which does not require precision reference voltages, and whose output is a signal whose level changes whenever the integrating operational amplifier reaches either of the threshold levels of the level detector, whereby the output of the information format converter is a signal varying in frequency according to the input resistance value of the input means.

It is an object of the present invention to provide a new and improved information format converter.

It is an object of the present invention to provide an information format converter which does not require precision reference voltages in order to operate accurately.

It is an object of the present invention to provide an information format converter which does not require periodic recalibration of the comparison reference voltage in order to operate accurately.

It is an object of the present invention to provide an information format converter which does not require that the integrator capacitor be discharged at the end of each cycle of operation.

It is an object of the present invention to provide a new and improved bi-stable level detector.

It is an object of the present invention to provide a new and improved voltage waveform generator.

DESCRIPTION OF THE PREFERRED EMBODIMENT

Figures 1, 2, 2A, 3, 3A, 4, 4A:
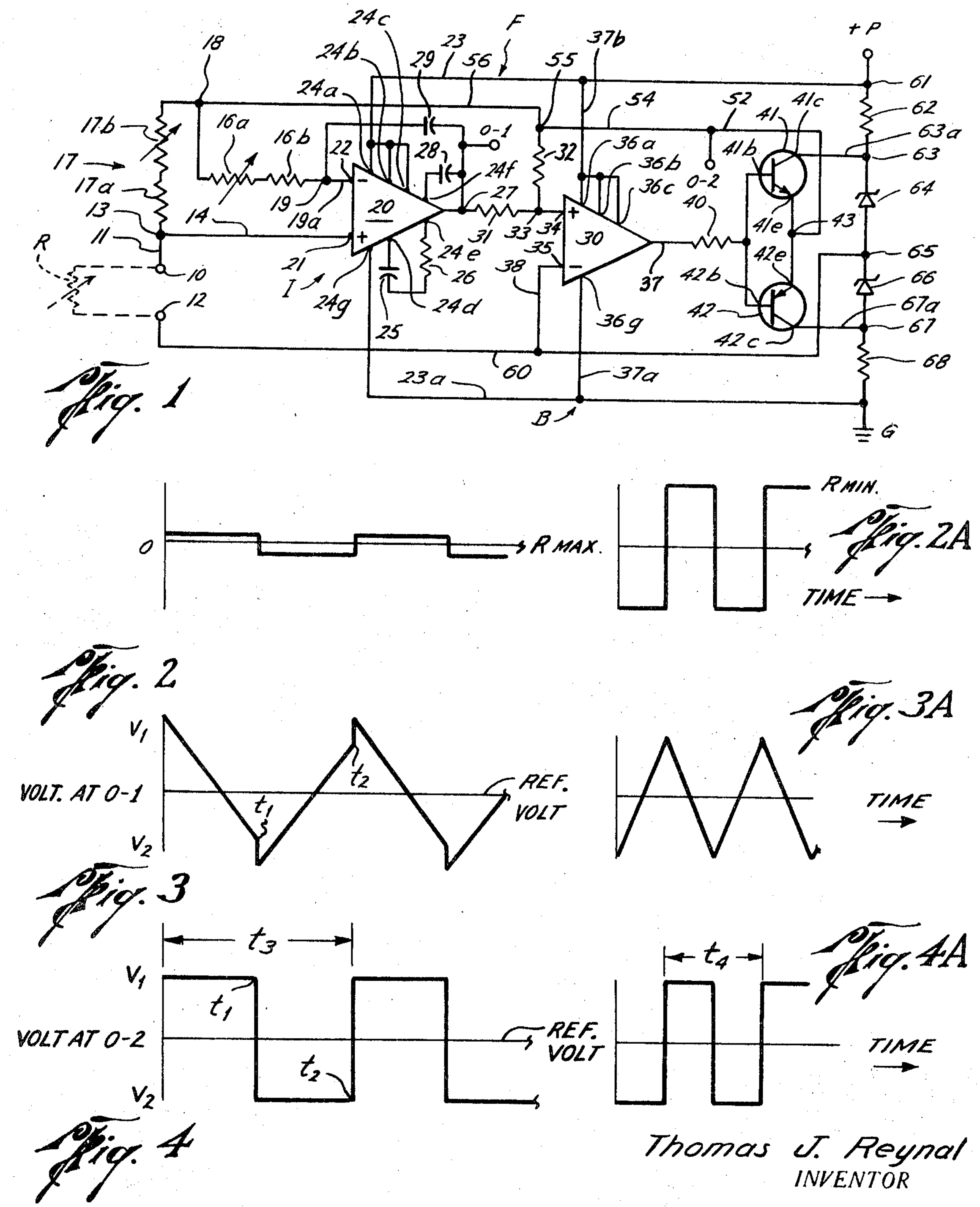
FIG. 1 illustrates the information format converter circuit of the present invention.
FIG. 2 and 2A illustrate two input current signals to the system.
FIG. 3 and 3A illustrate two output voltage signals at a terminal in the information format converter for corresponding input signals of FIG. 2 and 2A.
FIG. 4 and 4A illustrate output voltages of the bi-stable level detector of the information format converter for corresponding inputs of FIG. 2 and 2A.

In FIG. 1, an information format converter F according to the present invention is shown, comprising a variable input resistance R, an integrating circuit I, and a bi-stable level detector B.

The input variable resistance R is connected between a pair of input terminals 10 and 12 of the information format converter F. An electrical conductor 11 connects input terminal 10 to an electrical junction 13, which is also connected through an electrical conductor 14 to a positive input terminal 21 of an operational amplifier 20 of integrating circuit I. A resistance 17 comprising a fixed resistance **17*a* and, if desired, a variable resistance 17*b*, is connected between the electrical junction 13 and an electrical junction 18. A resistance 16, comprising a fixed resistance 16*b* and, if desired, a variable resistance 16*a* is connected between the junction 18 and an electrical junction 19, which is connected to a negative input terminal 22 of operational amplifier 20 by an electrical conductor 19*a***.

A positive terminal P of a direct current power supply (not shown) supplies operating power to a power terminal **24*a*, an offset adjust terminal 24*b*, and a gain adjust terminal 24*c* of operational amplifier 20 through an electrical conductor 23. A power common terminal G of the direct current power supply is connected to a power common terminal 24*g* of operational amplifier 20 through an electrical conductor 23*a*. An input lag control capacitance 25 and an input lag control resistance 26 are serially connected between a pair of input lag control terminals 24*d* and 24*e* of operational amplifier 20. An output lag control capacitance 28 is connected between an output lag control terminal 24*f* and an output terminal 27 of operational amplifier 20. A first output terminal 0–1 and a feedback integrating capacitance 29 of operational amplifier 20 are electrically connected to the output terminal 27, with the feedback integrating capacitance 29 being connected between the output terminal 27 and input terminal 22 through junction 19 and conductor 19*a***.

A resistance 31 electrically connects output terminal 27 to an electrical junction 33, which is connected to a positive input terminal 34 of an operational amplifier 30 of bi-stable level detector B. An electrical conductor **37*b* connected to electrical conductor 23, supplies operating power from positive terminal P to a power terminal 36*a*, an offset adjust terminal 36*b*, and a gain adjust terminal 36*c* of operational amplifier 30, and a conductor 37*a* connects a power common terminal 36*g* through the conductor 23*a*** to a power common terminal G.

A negative input terminal 35 of operational amplifier 30 is connected through an electrical conductor 38 to a reference electrical conductor 60, which is also connected to the input terminal 12. An output terminal 37 of operational amplifier 30 is connected through a base drive resistance 40 to a base **41*b* of an n-p-n transistor 41 and to a base 42*b* of a p-n-p transistor 42 of bi-stable level detector B. An output terminal 43 of bi-stable level detector B is connected to an emitter 41*e* of transistor 41 and an emitter 42*e* of transistor 42. An electrical feedback conductor 52 connects output terminal 43 to a second output terminal 0–2. A feedback conductor 54 connects output terminal 0–2 to a feedback junction 55 which is connected through a feedback resistance 32 to junction 33 at the positive input 34 of operational amplifier 30. A feedback conductor 56 connects feedback junction 55 to junction 18**.

A bias resistance 62 is connected at a junction 61 to the positive terminal P of the power supply and the electrical conductor 23 and at an electrical terminal 63 by an electrical conductor **63*a* to a collector 41*c* of transistor 41**.

A junction (or Zener) diode 64 is connected between the junction 63 and a reference potential terminal 65, which is connected by the reference conductor 60 to the input terminal 12 and through the conductor 38 to the negative input terminal 35 of operational amplifier 30 of bi-stable level detector B. A second junction (or Zener) diode 66 is serially connected between the reference potential junction 65 and an electrical terminal 67, which is electrically connected to a collector 42c of transistor 42 by an electrical conductor 67a. A power common bias resistance 68 is connected between the junction 67 and the power common terminal G.

FIG. 2 illustrates a current waveform of the current flowing through the resistance of the integrating operational amplifier of the respective embodiments herein set forth, with the variable input resistance R at its maximum value, while FIG. 2A illustrates a waveform of the current flowing through the resistance of the integrating operational amplifier with the variable input resistance R at its minimum value.

FIGS. 3 and 4 illustrate the voltage waveforms appearing at the output terminals 0–1 and 0–2, respectively, when input resistance R is at its maximum value causing the current waveform of FIG. 2 to occur.

FIGS. 3A and 4A illustrate the voltage waveforms appearing at the output terminals 0–1 and 0–2, respectively, when input resistance R is at its minimum value causing the current waveform of FIG. 2A to occur.

In FIG. 1A, FIG. 5, FIG. 5A, FIG. 6 and FIG. 6A, alternative embodiments of the information format converter F are illustrated. To facilitate understanding, components which are arranged in the format converter F in like manner and serve like functions as those set forth hereinabove, bear like representative numerals to those of FIG. 1.

Since the power supply connection utilized in each of the alternative embodiments illustrated in FIG. 1A, FIG. 5, FIG. 5A, FIG. 6 and FIG. 6A, is identical to that between the positive terminal P, the power common terminal G and the power terminals 24a and 36a, offset adjust terminals 24b and 36b, gain adjust terminals 24c and 36c, and power common terminals 24g and 36g of operational amplifiers 20 and 30, respectively, set forth hereinabove, these connections have been omitted from such figures to promote clarity in the drawings. Also, the input lag control capacitance 25 and resistance 26, and the output lag control capacitance 28 are connected to operational amplifier 20, in each of the alternative embodiments depicted in FIG. 1A, FIGS. 5 and 5A, and FIGS. 6 and 6A, although they have been omitted from such figures to preserve clarity in the drawings.

Further, since the circuitry connected to output terminals 0–2 and 37 of operational amplifier 30, and reference electrical conductor 60, at the broken lines, utilized in each of the alternative embodiments illustrated is identical to that set forth hereinabove with respect to FIG. 1, these components have been omitted from the figures to promote clarity in the drawings. It is to be understood that an information format converter built in accordance with such figures would include the power supply connections, lag control components and remaining components and connections connected to output terminals 0–2 and 37 of operational amplifier 30, and to conduit 60 as set forth hereinabove.

Figures 1A, 5, 5A, 6, 6A:
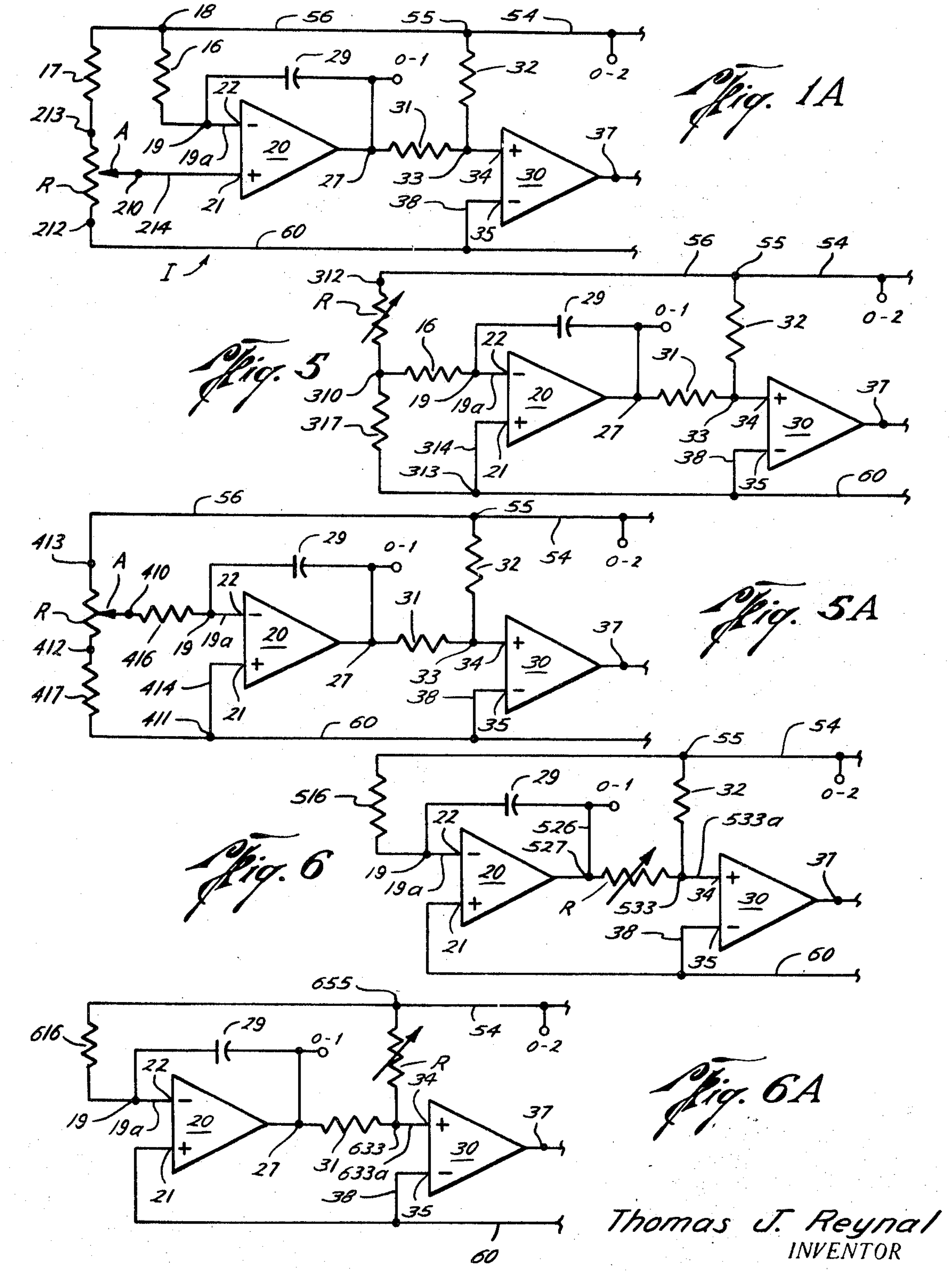
FIG. 1A illustrates the information format converter circuit of FIG. 1, modified to provide an output signal whose frequency varies in direct proportion to the input resistance.
FIG. 5 and 5A illustrate an alternative embodiment of the information format converters of FIG. 1 and 1A, respectively.
FIG. 6 and 6A illustrate a further alternative embodiment of the information format converters of FIG. 1 and 1A, respectively.

In FIG. 1A, a variable input resistance R is connected between a pair of input terminals 212 and 213. A resistance 17 is connected between the input 213 and an electrical junction 18. The junction 18 is connected through a resistance 16 to an input terminal 19 which is connected by an input terminal 19a to a negative input terminal 22 of an integrating operational amplifier 20. A reference electrical conductor 60 is connected to the input terminal 212. A movable arm A, positioned along the input resistance R in accordance with the varying input information, is electrically connected to the resistance R and through an input terminal 210 and input conductor 214 to a positive terminal 21 of operational amplifier 20.

In FIG. 5, a variable input resistance R is connected between a pair of input terminals 310 and 312. A resistance 16 electrically connects the terminal 310 to a terminal 19, which is connected through an electrical conductor 19a to a negative input terminal 22 of an operational amplifier 20, while an electrical conductor 56 connects input terminal 312 to a feedback terminal 55. A terminal 313 is electrically connected by a resistance 317 and the input terminal 310, and is also electrically connected by an electrical conductor 314 to a positive input terminal 21 of the operational amplifier 20.

In FIG. 5A, a variable input resistance R is connected between a pair of input terminals 412 and 413. A resistance 417 electrically connects the input terminal 412 to an electrical junction 411, which is electrically connected by a conductor 414 to a positive input terminal 21 of an operational amplifier 20. An electrical conductor 56 connects a feedback terminal 55 to the input terminal 413. A movable arm A, positioned along the input resistance R in accordance with the varying input information, is electrically connected to the resistance R and through an input terminal 410 by a resistance 416 to an input terminal 19, and from there through an electrical conductor 19a to a negative input terminal 22 of the operational amplifier 20.

In FIG. 6, in input resistance R is electrically connected between a pair of input terminals 527 and 533, the input terminal 527 also serving as the output terminal for an operational amplifier 20, and being connected by an electrical conductor 526 to an output terminal 0–1. An electrical conductor 533a connects the input terminal 533 to positive input terminal 34 of an operational amplifier 30. A resistance 32 electrically connects a feedback terminal 55 to the input terminal 533. A resistance 516 of the integrating operational amplifier 20 electrically connects the feedback terminal 55 to an electrical junction 19, which is connected by electrical conductor 19a to a negative input terminal 22 of an operational amplifier 20. An integrating feedback capacitance 29 electrically connects output terminal 0–1 to electrical junction 19. A reference electrical conductor 60 is connected to a positive input terminal 21 of operational amplifier 20, and through an electrical conductor 38 to a negative input terminal 35 of operational amplifier 30.

In FIG. 6A, a variable input resistance R is electrically connected between a pair of input terminals 633 and 655. A resistance 31 electrically connects an output terminal 27 of an operational amplifier 20 to the input terminal 633, while an electrical conduit 633a electrically connects a positive input terminal 34 of an operational amplifier 30 to the input terminal 633. A resistance 616 of integrating operational amplifier 20 electrically connects an electrical junction 19 to the input terminal 655, while an electrical conduit 54 connects an output terminal 0–2 to the input terminal 655. An output terminal 0–1 is electrically connected to the output terminal 27 of operational amplifier 20, and through an integrating feedback capacitance 29 to the electrical junction 19. A reference electrical conductor 60 is connected to a positive input terminal 21 of the operational amplifier 20, and through an electrical conductor 38 to a negative input terminal 35 of the operational amplifier 30. An electrical conductor 19a connects the junction 19 to a negative input terminal 22 of the operational amplifier 20.

OPERATION OF THE INVENTION

Fig. 1

In the operation of the present invention, direct current power is furnished at terminal P and is fed through conductor 23 to power terminal 24a, offset adjust terminal 24b and gain adjust terminal 24c to energize operational amplifier 20, with a power return connection 24g being connected through electrical conductor 23a to power common terminal G; and through conductor 37 to power terminal 36a, offset adjust terminal 36b and gain adjust terminal 36c to energize operational amplifier 30 with a power return connection 36g being connected through electrical conductor 37a to electrical conductor 23a to power common terminal G.

The output lag control capacitance 28 electrically connects output terminal 27 to output lag control 24f, and input lag control capacitance 25 and resistance 26 connect input lag control terminals 24d and 24e to prevent operational amplifier 20 from oscillating.

The bias resistance 62, the Zener diodes 64 and 66 and the power common bias resistor 68 are connected in a series electrical circuit between the direct current power terminal P and the power common terminal G, to establish the output potential levels of the bi-stable level detector B and the integrator I, as well as the potential at the reference potential junction 65. The bias resistance 62 and power common bias resistance 68 are chosen so that the current flowing from terminal P to power common terminal G is sufficient to maintain the Zener diodes 64 and 66 in their region of operating condition where a change in current does not substantially change the potential drop across the Zener diodes 64 and 66.

The potential drop across the bias resistance 62 caused by such flow of current establishes at terminal 63 a first output potential level, $V_1$, (FIGS. 3, 3A, 4 and 4A) of the bi-stable level detector B, while the potential drop caused by the flow of such current through power common bias resistance 68 establishes at terminal 67 a second output potential level, $V_2$, of the bi-stable level detector B. The potential drop across Zener diode 66, to the potential $V_2$ at terminal 67, establishes at terminal 65 a comparison reference operating potential $V_{REF}$ which is fed to the input terminal 12 via electrical conduit 60, and to negative input terminal 35 of operational amplifier 30 of bi-stable level detector B through conductor 38. It should be noted at this point that the potential levels established in the bi-stable level detector B are not required to be precision levels, since the same voltage reference is applied to each of variable input resistance R, integrator I and bi-stable level detector B, and consequently any variance or drift in the level will uniformly affect each.

The output potential level of the bi-stable level detector output terminal 0–2 alternates between potential $V_1$ and $V_2$ as the transistors 41 and 42 are alternately energized, as will be discussed below, and thus the waveform appearing at terminal 0–2 is a square wave (FIGS. 4 and 4A).

Assuming for the purposes of illustration that transistor 41 has been energized in a manner to be set forth below, the emitter 41*e* and the terminal 43 will thus be effectively at the same potential, $V_1$, as the terminal 63, thus causing output terminal 0–2 of bi-stable level detector B by electrical connection through conductor 52, and feedback terminal 55 by electrical connection through conductor 54, to be at the first output potential $V_1$ (FIGS. 4 and 4A).

Current (FIGS. 2 and 2A) flows between the terminal 18 and input terminal 12, which is at potential $V_{REF}$, due to the potential drop between such terminals across resistance 17 and variable input resistance R. The potential at terminal 13 increases as the resistance value of input resistance R increases, and decreases as the resistance value of input resistance R decreases, due to the potential drop caused by the current flowing from terminal 18 through resistances 17 and R to terminal 12.

The resistance 16 serves to provide a potential drop between terminals 18 and 19 to insure that the terminals 19 and 13, and consequently the input terminals 21 and 22 of operational amplifier 20, are at the same potential, and further serves in combination with the integrating feedback capacitance 29 and operational amplifier 20 to perform the integrator function of the integrator I. The output voltage at terminal 27 of operational amplifier 20 is the time integral of the input voltage at terminal 18. See Millman and Taub, "Pulse, Digital and Switching Waveforms," McGraw-Hill Book Company, 1965 p. 17, for further description of the operational amplifier integrator. Since the voltage waveform appearing at terminal 18 is the square wave, appearing at output terminal 0–2, the voltage waveform appearing at terminal 27 and 0–1 is the integral of a square wave, the sawtooth waveform (FIGS. 3 and 3A).

FIG. 1: INPUT RESISTANCE HIGH

When input resistance R is set at a relatively high level according to the input parameter being monitored, the potential at terminals 13 and 19 is correspondingly high with respect to the reference operating potential, due to the relatively large potential drop across the high input resistance R, causing a relatively low input current through resistance 16 (FIG. 2), and a similarly low current through resistance 17.

The amplified output voltage at terminal 27 of operational amplifier 20 differs from the potential at input terminal 19 by an amount causing a current to flow through integrating feedback capacitance 29 equal in magnitude and opposite in polarity to the input current flowing through resistance 16 into terminal 19 to thereby cause substantially zero current to flow in conductor 19*a* into operational amplifier 20 and also maintaining terminal 19 at a substantially constant potential. Since the current in resistance 16 is relatively small, the current through capacitance 29 charging such capacitance is also relatively small, and therefore the voltage at terminal 27 does not change very rapidly causing a relatively longer integrator charging time. As current flows charging capacitance 29, terminal 27 becomes increasingly negative due to resistance 16 and capacitance 29 being connected to terminal 19 and negative input terminal 22 with respect to feedback terminal 55, which is at potential $V_1$ (FIG. 3), causing current to flow from terminal 55 through resistances 31 and 32. At a time $t_1$ (FIGS. 3 and 4) when terminal 27 becomes sufficiently negative with respect to terminal 55, sufficient current flows through resistance 32 to cause the voltage drop across resistance 32 to render terminal 33 negative with respect to reference potential applied at terminal 35, causing output terminal 37 of operational amplifier 30 to become negative in potential. This negative voltage de-energizes, through current limiting base drive resistance 40 which protects transistors 41 and 42, the transistor 41 of the bi-stable level detector B at its base 41*b* and energizes the transistor 42 of the bi-stable level detector B at its base 42*b*. When transistor 42 is energized, its emitter 42*e* and thus terminal 43, output terminal 0–2, feedback terminal 55, and terminal 18 assume the potential $V_2$ (FIG. 4) of terminal 67, thus completing the first half-cycle of operation of the information format converter F. At the time, $t_1$, of transition terminals 18, 19 and 13 become negative with respect to reference potential at input terminal 12, reversing the polarity of current flowing through input resistance R and resistances 16 and 17, but not changing the magnitude of such current.

At the time, $t_1$, of transition, integrating capacitance 29 is charged to a certain level and thus there is a potential difference between terminals 19 and 27. Since the charge of capacitance 29 cannot change instantaneously, when terminal 18 changes polarity at the time $t_1$ to voltage level $V_2$ driving terminal 19 to a lower potential than it previously possessed, the potential drop represented by the charge stored in capacitance 29 drives the potential of terminal 27 slightly beyond the potential $V_2$ (FIG. 3) assisting in the transition between potentials $V_1$ and $V_2$ by increasing the input into terminal 34 of operational amplifier 30 and increasing the voltage output thereof, which increases the current into base 42*b* of transistor 42, making transistor 42 operate in a shorter time.

Capacitance 29 is not discharged before the next half-cycle of operation begins, the flow of current which has caused the charge to accumulate is merely reversed, in order to equal and to offset the reversed current in resistance 16 and maintain terminal 19 at substantially constant potential, and the charge stored in capacitance 29 during the previous half-cycle of operation provides a part of this reversed current. As capacitance 29 is discharging, terminal 27 is becoming increasingly positive with respect to input terminal 19, to provide additional current to maintain terminal 19 at constant potential and offset the current in resistance 16. As terminal 27 becomes more positive, current flows through resistances 31 and 32, due to the potential difference between terminal 27 and feedback terminal 55 which is at potential $V_2$. At a time $t_2$ (FIG. 3), the potential difference between terminal 27 and feedback terminal 55 causes sufficient current to flow through resistance 31 to cause a voltage drop across resistance 31 rendering terminal 33 of operational amplifier 30 positive with respect to reference potential applied to input terminal 35, rendering the output of operational amplifier 30 positive and de-energizing transistor 42 of bi-stable level detector B at its base 42*b* and energizing base 41*b* of transistor 41, causing emitter 41*e*, terminal 43, output terminal 0–2, feedback terminal 55 and terminal 18 to assume voltage level $V_1$ of terminal 63, completing the second half-cycle of operation of the information format converter F, beginning the next cycle of operation.

It can thus be seen that the voltage appearing at output terminal 0–2 of the information format converter F is a square wave, and the voltage at output terminal 0–1 is a sawtooth wave, each of whose period is a time $t_3$.

FIG. 1: INPUT RESISTANCE LOW

When the input parameter has established the varying input resistance R at a relatively low level, the potential at terminals 13 and 19 is correspondingly low with respect to the potential at terminal 18, and the potential drop across resistances 17 and 16 is correspondingly high, causing an increased input current into input terminal 19 connected to negative input terminal 22 of operational amplifier 20 (FIG. 2A). The increased current in resistance 16 causes an increased current through capacitance 29 and decreases the time required for the integrator I to charge to a level $V_1$ or $V_2$ (FIG. 3A) sufficient to cause current flowing through resistances 31 and 32 to actuate operational amplifier 30 to change states and thereby de-energize the currently operating transistor and to energize the non-operating transistor in the manner set forth above, changing the output level appearing at output terminal 0–2 (FIG. 4A). This decreased charging time causes the period of the output square wave appearing at terminal 0–2 to be correspondingly less, as is shown by a time $t_4$ in FIG. 3A.

It can thus be seen that as the resistance value of the variable input resistance R decreases in accordance with the decreasing values of the parameter being monitored, the potential at points 13 and 19 correspondingly decreases, causing an increase in the input current into terminal 19 leading into input terminal 22 of operational amplifier 20. Matching the increased input current in resistance 16 is an increased input current in capacitance 29 requiring a shorter time to change the potential of output terminal 27 to a level sufficient to cause operational amplifier 30 of bi-stable level detector B to de-energize the presently conducting transistor and energize the non-conducting transistor, causing bi-stable level detector B to change states, so that in the circuit of FIG. 1, the output signal at terminals 0–1 and 0–2 has a period which is directly proportional to the resistance value of the variable input resistance R.

FIG. 1A

In the operation of the embodiment of the invention shown in FIG. 1A, the arm A of variable input resistance R is positioned along the resistance R in accordance with the parameter being monitored. The circuit of FIG. 1A operates in substantially the same manner as the circuit of FIG. 1, and produces substantially the same output waveforms shown in FIGS. 3, 3A, 4 and 4A, except that the frequency of the square wave signal output of terminal 0–2, instead of its period, varies in direct relation to the resistance value of the variable input resistance R.

When the arm A is positioned at terminal 213, the voltage at terminals 210 and 19 is at a maximum, causing the current in resistance 16 to be minimum, thus requiring a longer time to change the potential of terminal 27 in order to actuate operational amplifier 30 of bi-stable level detector B in the manner set forth above. As the parameter being monitored changes, the arm A moves further along the variable input resistance R, increasing the potential drop between terminal 18 and terminals 210 and 19, thus increasing the input current into the terminal 19 leading to the negative input terminal 22 of integrating operational amplifier 20, and thereby creating an increased current in capacitance 29, decreasing the time required for the integrator I to actuate operational amplifier 30 of the bi-stable level detector B, and thereby increasing the frequency of the transitions between levels in the voltage waveform appearing at output terminal 0–2 of the bi-stable level detector B. Thus, the frequency of the output signal appearing at output terminal 0–2 is directly proportional to the amount of resistance inserted by variable resistance R between the terminals 213 and 210.

FIG. 5

FIG. 5 illustrates an information format converter F generally similar to that of FIG. 1, except that the fixed resistance 317 is connected in the input circuit between the input terminal 313, which leads to the positive input 21 of operational amplifier 20, and input terminal 310, which leads to negative input 22 of amplifier 20, in the position where the input variable resistance R of FIG. 1 is located. The input variable resistance R of FIG. 5 is connected between the feedback terminal 55 and input terminal 310 leading to negative input terminal 22 of amplifier 20, where fixed resistance 17 of FIG. 1 is located. As the variable input resistance R varies, the potential of terminal 310 varies inversely, thus varying the input current to integrator I in inverse relation to the input resistance R, thus causing the period of the output waveform to vary in direct proportion to the variable input resistance R.

FIG. 5A

FIG. 5A illustrates an information format converter generally similar to that of FIG. 1A, except that the fixed resistance 417 is connected in the input circuit between the input terminal 411, leading to the positive input terminal 21 of amplifier 20, and input terminal 412, which leads to the negative input 22 of amplifier 20, where the input variable resistance R of FIG. 1A is located. The input variable resistance R of FIG. 5A is connected between the feedback terminal 55 and the input terminal 412 leading to the negative input terminal 22 of amplifier 20 where the fixed resistance 17 of FIG. 1A is located, with the arm A electrically connected through a tap 410 to resistance 416 and then to the negative input terminal 22 of amplifier 20. As the variable input resistance R varies, the potential of terminal 410 varies directly, thus varying the input current to integrator I in direct relation to the variable input resistance R, thus causing the frequency of the output waveform to vary in direct proportion to the variable resistance R.

FIG. 6

In FIG. 6, the resistance 516, capacitance 29 and amplifier 20 form the integrating operational amplifier I. Since the output of the bi-stable level detector B causes the potential at output terminal 0–2 and feedback terminal 55 to be a direct current level of either $V_1$ of $V_2$ for each half-cycle of operation (FIG. 4) as set forth above, the output voltage at terminal 527 is the integral of this voltage level, or the sawtooth waveform of FIG. 3. When the input variable resistance R is set at a maximum according to the input parameter being monitored, the potential drop between the terminals 55 and 527 occurs predominantly across the resistance R, and the potential at the terminal 533 is relatively high with respect to terminal 0–1, and the integrator I is required to charge for a longer time in order to change the potential at terminal 0–1 sufficiently to change the potential of terminal 533 to cause the operational amplifier 30 to de-energize the presently operating transistor and energize the presently non-operating transistor, causing the bi-stable level detector B to change the potential of terminal 0–2 in the manner set forth hereinabove.

As the input variable resistance R is decreased to its minimum according to the input parameter being monitored, the potential drop between the terminals 55 and 527 occurs more and more predominantly across resistance 32, and the potential at terminal 533 becomes relatively lower with respect to terminal 0–1, and integrator I is required to charge for a shorter time in order to change the potential at terminal 0–1 sufficiently to change the potential of terminal 533 so as to cause operational amplifier 30 to change the potential at output terminal 0–2 of the bi-stable level detector B.

It can be seen that in the circuit of FIG. 6, the period of the waveform appearing at terminals 0–1 and 0–2 varies in direct proportion to the resistance value of the input variable resistance R.

FIG. 6A

In FIG. 6A, the resistance 616, capacitance 29, and operational amplifier 20 form the integrating operational amplifier I. Since the output of the bi-stable level detector B causes the potential at output terminal 0–2 and feedback 55 to be a direct current level of either $V_1$ or $V_2$ for each half-cycle of operation (FIG. 4) as set forth above, the output voltage at terminal 27 is the integral of this direct current level, or the sawtooth waveform of FIG. 3. When input variable resistance R is set at a minimum according to the input parameter being monitored, the potential drop between the terminals 655 and 27 occurs predominantly across resistance 31 and the potential at terminal 633 is relatively high with respect to terminal 0–1, and integrator I is required to charge for a longer time in order to change the potential at terminal 0–1 sufficiently to change the potential of terminal 633 to actuate operational amplifier 30 to cause the bi-stable level detector B to change the potential appearing at output terminal 0–2.

As the input variable resistance R is increased to its maximum according to the input parameter being monitored, the potential drop between the terminals 27 and 655 occurs more and more predominantly across the variable input resistance R, and the potential at terminal 633 is relatively low with respect to terminal 0–1 and the integrator I is required to charge for a shorter time in order to change the potential at terminal 0–1 sufficiently to change the potential of terminal 633 to operate the bi-stable level detector B to change the potential appearing at output terminal 0–2.

Thus, it can be seen that in the circuit of FIG. 6A, the frequency of the waveform appearing at the terminals O–1 and 0–2 varies in direct proportion to the resistance value of the input variable resistance R.

The input variable resistance R varies in accordance with the parameter of the input being measured, and gives an indication of the change in value of the parameter by a corresponding change in its resistance value. The parameter being measured could be, for example, pressure of fluid or gas in a pipe, measured by a pressure transducer, and converted into a resistance value of the input variable resistance R, or the input variable resistance R could be a thermistor whose resistance value changes according to the temperature being measured, or a strain gage whose resistance would change in accordance with the elongation of a body being measured, or any other variable input parameter which could be represented as a variable resistance value.

VOLTAGE WAVEFORM GENERATOR

The information format converter F of the present invention can also be used as an oscillator, or voltage waveform generator.

As set forth hereinabove, each embodiment of the information format converter F. generates an output sawtooth wave, appearing at terminal 0–1, and an output square wave, appearing at terminal 0–2, each of whose frequency varies in accordance with the value of the variable input resistance R.

When the variable resistance R is removed and replaced by a fixed resistance, the output sawtooth wave appearing at terminal 0–1 and the output square appearing at terminal 0–2 will have a fixed frequency determined in accordance with the fixed resistance inserted into the circuit in the place of the variable input resistance R.

Thus, it can be seen that the information format converter of the present invention can serve as a voltage waveform generator if the variable input resistance R is removed and replaced by a predetermined fixed resistance. The voltage waveform generator created by insertion of a fixed resistance in place of the variable input resistance R is particularly useful in generation of fractional cycle frequencies such as one-half, one-quarter, (or lower) cycles per second. Frequencies as low as one cycle per 120 minutes have been generated by the voltage waveform generator.

To provide a higher degree of accuracy in the information format converter of the present invention, a variable resistance **16*a* and a variable resistance 17*b* can be inserted in the embodiment of the invention illustrated in FIG. 1 so as to compensate for varying tolerances in the input resistance R and the integrating capacitance 29 to provide a higher degree of accuracy in the information format converter F. Also, the resistance 31 could be variable and the resistance 16 could be fixed in the circuit of FIG. 1 in order to compensate for the tolerances of integrating capacitor 29**.

Further, in some instances it is not necessary to connect to the offset adjust terminals and the gain adjust terminals **24*b* and 36*b* and 24*c* and 36*c*, of operational amplifiers, respectively, due to the amount of gain required from operational amplifiers 20 and 30**.

Additionally, capacitances 25 and 28, and resistance 26 are built into some of the more expensive currently available operational amplifiers, and would therefore not be necessary should these more expensive amplifiers be used. Also, it should be noted that although an integrated circuit operational amplifier is illustrated in the figures of the drawings, a vacuum tube operational amplifier would work equally well in operational amplifiers 20 and 30 in the information format converter of the present invention. Finally, an output lag control capacitor could be connected at the output of operational amplifier 30 to aid in preventing operational amplifier 30 from oscillating, but this will introduce an error in the output waveform at terminal 0–2 by increasing the slope of the switching between levels in the output waveform at terminal 0–2.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

I claim:

1. An information format converter for converting input variables indicated by a resistance to an output signal of a corresponding frequency, comprising:
   - a. input means whose resistance value varies in accordance with the input parameter being measured;
   - b. charge storage means whose charging time varies in accordance with the resistance of said input means; and
   - c. output means responsive to said storage means and having two output threshold levels, said output means comprising bi-stable level detector means for providing predetermined alternative voltage output levels in accordance with the input thereto, comprising:
     1. amplifier means having a plurality of input terminals; and
     2. first means for actuating said bi-stable level detector to provide a first of its predetermined alternative voltage output levels in response to the input to said amplifier means, said levels changing when said storage means reaches either of said two threshold levels whereby said output means produces a two-level output signal changing between levels at a frequency varying in accordance with the input parameter.

2. The structure of claim 1 wherein said bi-stable level detector means comprises:
   - (a) second means for actuating said bi-stable level detector to provide the second it its predetermined alternative voltage output levels in response to the input to said amplifier means;
   - (b) said first means and said second means being mutually exclusively operable, and being connected in common at their outputs to form the output terminal of said bi-stable level detector; and (c) feedback means connecting said output terminal to an input terminal of said amplifier means.

3. The structure of claim 2, including:

a. means for supplying direct current power to said bi-stable level detector; and b. means for establishing a comparison reference operating potential for said format converter with respect to the voltage output of said power supply.

4. The structure of claim 3 wherein:

a. said first actuating means of said level detector is a first transistor, receiving at its base the output of said amplifier means;

b. said second actuating means of said level detector is a second transistor opposite in conductivity to said first transistor, receiving at its base the output of said amplifier means; and c. the emitters of said first and said second transistors being connected and forming the output terminal of said bi-stable level detector.

5. The structure of claim 4, wherein said operating potential establishing means comprises:

a. a first Zener diode, connected at one terminal to said power supply and the collector of said first transistor;

b. a second Zener diode, serially connected between a second terminal of said first diode and the collector of said second transistor;

c. the collector of said second transistor being connected to a power common terminal of said power supply; and d. the junction between said first diode and said second diode having a potential established by said diodes, and serving as a reference potential junction for said format converter.

6. The structure of claim 5, wherein:

a. said storage means comprises:

1. an integrator operational amplifier having a plurality of input terminals;
2. an integrating capacitance connecting the output of said operational amplifier to a first input terminal thereof;
3. a resistance for connecting said input means to said first input terminal, further serving as the resistance of said integrator operational amplifier;
4. a second input terminal of said operational amplifier being connected to said reference operating potential junction;

b. said feedback means further including second feedback means for connecting the output terminal of said bi-stable level detector to said integrator.

7. The structure of claim 6 wherein said input means comprises;

a. an input resistance, variable according to value of input parameter, connected between said reference junction and said second input of said integrator operational amplifier; and b. a fixed resistance connected between said input resistance and said connecting resistance whereby the charging period of the integrator is directly proportional to the value of said input parameter, and the period of transitions of the output is directly proportional to the value of the input parameter.

8. The structure of claim 6 wherein said input means comprises:

a. a first fixed resistance, connected to said reference terminal and having a tap positioned thereon according to the input parameter being measured, said tap being connected to said second input of said integrator operational amplifier;

b. a second fixed resistance connected between said first fixed resistance and said connecting resistance of said first input terminal of said operational amplifier integrator whereby the charging period of the integrator is inversely proportional to the value of said input parameter, and thereby the frequency of the transitions between said output levels is directly proportional to the value of the input parameter.

9. The structure of claim 6 wherein said input means comprises:

a. a fixed resistance connected between said reference terminal and said connecting resistance; and b. a variable resistance connected between said second feedback means and said connecting resistance wherein the charging period of the integrator is directly proportional to the value of said input parameter, and the period of transitions of the output is directly proportional to the value of the input parameter.

10. The structure of claim 6, wherein said input means comprises:

a. a first fixed resistance connected to said second feedback means having a tap positioned thereon according to the input parameter being measured, said tap connected to said connecting resistance; and b. a second fixed resistance being connected between said first fixed resistance and said reference terminal wherein the charging period of the integrator is inversely proportioned to the value of the input parameter and wherein the frequency of the transitions between said output levels is directly proportional to the value of the input parameter.

11. The structure of claim 6 wherein said input means comprises:

a. an input resistance variable according to the value of the input parameter and connected between the output of said integrator operational amplifier and said amplifier of said level detector; and b. means for connecting said reference terminal directly to said second input of said integrator operational amplifier.

12. The structure of claim 6 wherein said input means comprises:

a. an input resistance variable according to the value of the input parameter and connected between the input of said level detector amplifier and said feedback means; and b. means for connecting said reference terminal directly to said second input of said integrator operational amplifier.

13. A voltage waveform generator for producing voltage waveforms of a predetermined frequency, comprising:

a. a fixed input resistance whose resistance value establishes the predetermined frequency;

b. charge storage means whose charging time is established in accordance with the fixed input resistance and whose output provides a sawtooth waveform of the predetermined frequency; and c. output means responsive to said storage means and having two output threshold levels, said output means comprising bi-stable level detector means for providing predetermined alternative voltage output levels in accordance with the input thereto, comprising:

1. amplifier means having a plurality of input terminals; and
2. first means for actuating said bi-stable level detector to provide a first of its predetermined alternative voltage output levels in response to the input to said amplifier means, said levels changing when said storage means reaches either of said two threshold levels, whereby said output means generates a square wave signal of the predetermined frequency.

14. The structure of claim 13, wherein said bi-stable level detector comprises:

(a) second means for actuating said bi-stable level detector to provide the second of its predetermined alternative voltage output levels in response to the input to said amplifier means;

(b) said first means and said second means being mutually exclusively operable, and being connected in common at their outputs to form the output terminal of said bi-stable level detector; and (c) feedback means connecting said output terminal to an input terminal of said amplifier means.

15. The structure of claim 14, including:

a. means for supplying direct current power to said bi-stable level detector; and b. means for establishing a comparison reference operating potential for said waveform generator with respect to the voltage output of said power supply.

16. The structure of claim 15 wherein:

a. said first actuating means of said level detector is a first transistor, receiving at its base the output of said amplifier means;

b. said second actuating means of said level detector is a second transistor opposite in conductivity to said first transistor, receiving at its base the output of said amplifier means; and c. the emitters of said first and said second transistors being connected and forming the output terminal of said bi-stable level detector.

17. The structure of claim 16, wherein said operating potential establishing means comprises:

a. a first Zener diode, connected at one terminal to said power supply and the collector of said first transistor;

b. a second Zener diode, serially connected between a second terminal of said first diode and the collector of said second transistor;

c. the collector of said second transistor being connected to a power common terminal of said power supply; and d. the junction between said first diode and said second diode having a potential established by said diodes, and serving as a reference potential junction for said waveform generator.

18. The structure of claim 17, wherein:

a. said storage means comprises;

1. an integrator operational amplifier having a plurality of input terminals;
2. an integrating capacitance connecting the output of said operational amplifier to a first input terminal thereof;
3. a resistance for connecting said input means to said first input terminal, further serving as the resistance of said integrator operational amplifier;
4. a second input terminal of said operational amplifier being connected to said reference operating potential junction;

b. said feedback means further including second feedback means for connecting the output terminal of said bi-stable level detector to said integrator.

19. The structure of claim 18 wherein said input means comprises:

a. a fixed input resistance connected between said reference junction and said second input of said integrator operational amplifier; and b. a fixed resistance connected between said input resistance and said connecting resistance.

20. The structure of claim 18 wherein said input means comprises:

a. a first fixed resistance, connected to said reference terminal and having a tap positioned thereon according to the output frequency being generated, said tap being connected to said second input of said integrator operational amplifier;

b. a second fixed resistance connected between said first fixed resistance and said connecting resistance of said first input terminal of said operational amplifier integrator.

21. The structure of claim 18 wherein said input means comprises:

a. a fixed resistance connected between said reference terminal and said connecting resistance; and b. a second fixed resistance connected between said second feedback means and said connecting resistance.

22. The structure of claim 18 wherein said input means comprises:

a. a first fixed resistance connected to said second feedback means having a tap positioned thereon according to the output frequency being generated, said tap connected to said connecting resistance; and b. a second fixed resistance being connected between said first fixed resistance and said reference terminal.

23. The structure of claim 18 wherein said input means comprises:

a. a fixed resistance connected between the output of said integrator operational amplifier and said amplifier of said level detector; and b. means for connecting said reference terminal directly to said second input of said integrator operational amplifier.

24. The structure of claim 18 wherein said input means comprises:

a. A fixed resistance connected between the input of said level detector amplifier and said feedback means; and b. means for connecting said reference terminal directly to said second input of said integrator operational amplifier.

25. The structure of claim 1, wherein said bi-stable level detector means comprises:

(a) second means for actuating said bi-stable level detector to provide the second of its predetermined alternative voltage output levels in response to the input; and (b) said first means and said second means being mutually exclusively operable, and being connected in common at their outputs to form the output terminal of said bi-stable level detector.

26. The structure of claim 13, wherein said bi-stable level detector means comprises:

(a) second means for actuating said bi-stable level detector to provide the second of its predetermined alternative voltage output levels in response to the input; and (b) said first means and said second means being mutually exclusively operable, and being connected in common at their outputs to form the output terminal of said bi-stable level detector.

* * * * *